United States Patent

Gloor et al.

[11] Patent Number: 5,233,759
[45] Date of Patent: Aug. 10, 1993

[54] COMPENSATING MAGNETIC COMPASS

[75] Inventors: Hans Gloor; Denis Gigon, both of Biel, Switzerland

[73] Assignee: Recta AG, Biel, Switzerland

[21] Appl. No.: 989,754

[22] Filed: Dec. 14, 1992

[30] Foreign Application Priority Data

Dec. 30, 1991 [CH] Switzerland .................... 19423

[51] Int. Cl.$^5$ ............................................. G01C 17/04
[52] U.S. Cl. ................................. 33/355 R; 33/359; 33/346
[58] Field of Search ............ 33/355 R, 356, 346, 33/358, 359, 357

[56] References Cited

U.S. PATENT DOCUMENTS

| | | | |
|---|---|---|---|
| 1,001,598 | 8/1911 | Hertzberg | 33/346 |
| 4,700,490 | 10/1987 | Kramer et al. | 33/355 R |
| 4,920,656 | 5/1990 | Cross | 33/355 R |

Primary Examiner—William A. Cuchlinski, Jr.
Assistant Examiner—Alvin Wirthlin
Attorney, Agent, or Firm—Michael Ebert

[57] ABSTRACT

A tilt-compensating magnetic compass formed by a capsule enclosing a rotatable pointer to indicate direction and a rotatable magnetic-field detector provided with a permanent magnet. The detector, which is rotatable about an axis colinear with the axis about which the pointer rotates, orients itself with respect to the earth's magnetic field, the detector being tiltable to a degree depending on the inclination of the magnetic field and on the attitude of the compass with respect to the horizontal plane. The detector is mechanically linked to the pointer so that rotation of the detector results in a corresponding rotation of the pointer regardless of the degree of tilt, whereby the pointer accurately indicates direction. The linkage consists of a pin projecting from the detector and passing through a slot in a fork extending from the pointer, whereby when the detector tilts, the pin then shifts within the slot, but remains coupled to the fork to maintain the linkage without imparting movement to the pointer.

11 Claims, 1 Drawing Sheet

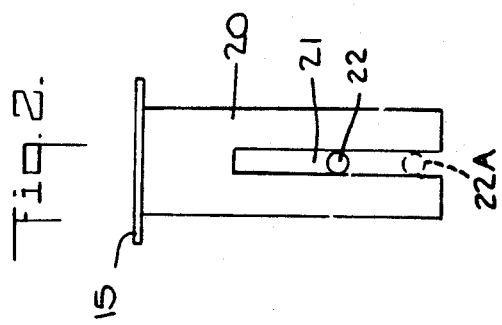
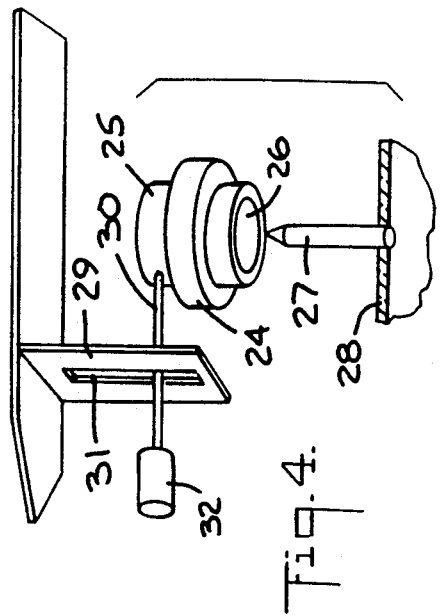
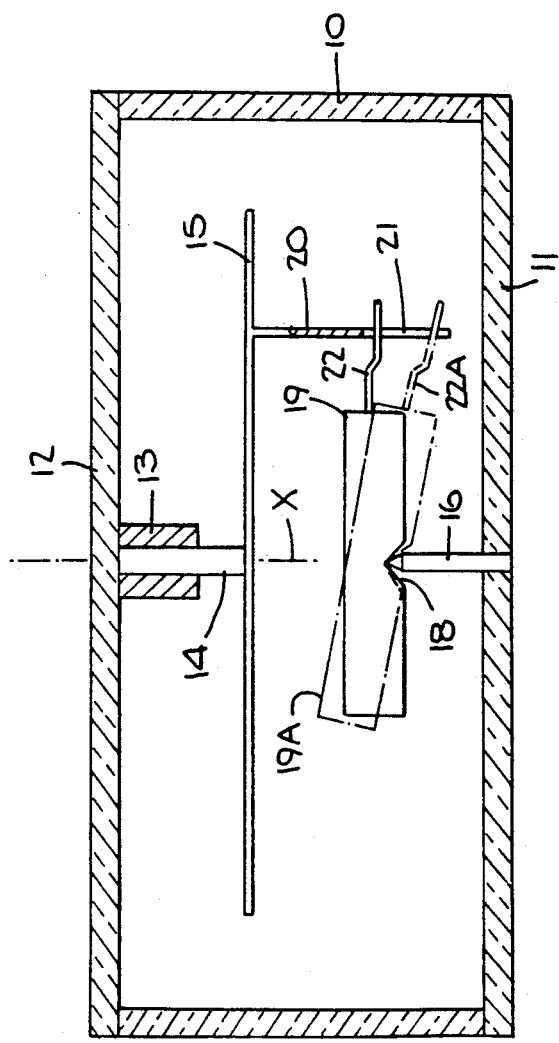
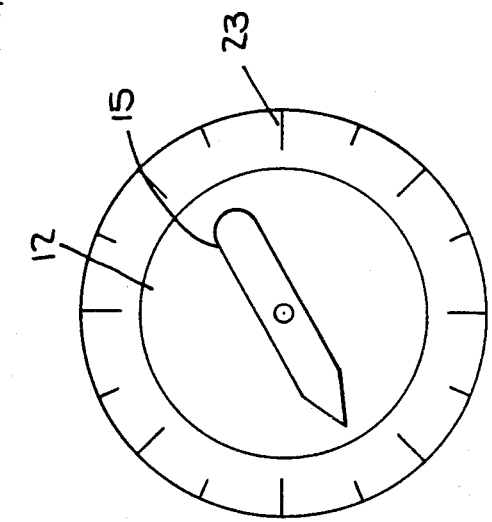

COMPENSATING MAGNETIC COMPASS

BACKGROUND OF INVENTION

1. Field of Invention

This invention relates generally to magnetic compasses, and more particularly to a compass that includes a rotatable pointer to indicate direction and a rotatable magnetic field detector that orients itself with respect to the earth's magnetic field and is so linked to the pointer that rotation of the detector produces a corresponding rotation of the pointer regardless of the degree to which the detector tilts as a result of the inclination of the magnetic field and the attitude of the compass with respect to the horizontal plane.

2. Status of Prior Art

A magnetic compass is a device for determining direction. In its traditional form, it consists of a magnetized needle supported for rotation within a capsule or casing having a transparent cover. The needle, which acts as a pointer, aligns itself with the earth's magnetic field, a scale marked in degrees serving to specify direction relative to this magnetic field. Modern compasses make use of iron alloys or ferrite magnets capable of permanently maintaining a strong magnetization.

In a magnetic compass, it is conventional to mount the needle on a pointed staff serving as a fulcrum, the point of the staff being received in a jewel bearing to minimize friction so that the needle is free to tilt as well as to rotate. Such compass needle mountings are disclosed in the Swiss patent CH 663091 to Recta (1987), the German patent 173,956 to Neufeldt and Kuhne (1906), the Japanese patent 58-129289 to Matsushita Denki Sangyo (1983), and the Swiss patent 32 8760 to Recta (1976).

A standard magnetic compass in which the magnetized pointer or needle is free to tilt as well as to rotate within a casing has serious drawbacks. Should the needle become angled relative to the top or bottom wall of the casing and the degree of tilt is such that the needle touches one of these walls, movement of the needle will be arrested, as a consequence of which an accurate reading of direction will not be obtained.

Tilting of the needle occurs, not only when the attitude of the compass deviates from the horizontal plane so that it is not level, but also when the compass is used in different latitudes of the earth. The earth's magnetic field has different inclinations at different latitudes, this causing the rotatable needle to more or less dip to a degree that depends on the prevailing inclination.

The term "magnetic field detector" as used herein refers to a rotatable device which incorporates in its structure one or more permanent magnets, so that the device rotates to orient itself with respect to the earth's magnetic field.

SUMMARY OF INVENTION

In view of the foregoing, the main object of this invention is to provide a tilt-compensating compass which produces accurate readings of direction regardless of the degree to which its magnetic field detector tilts.

More particularly, an object of this invention is to provide a compass of the above type in which direction is indicated by a rotatable, non-magnetic pointer that is so coupled to a rotatable and tiltable magnetic field detector, whereby rotation of the detector produces a corresponding rotation of the pointer regardless of the degree to which the detector tilts.

Also an object of this invention is to provide a tilt-compensating magnetic compass of simple yet efficient design which may be mass produced at low cost.

Briefly stated, these objects are attained in a tilt-compensating magnetic compass formed by a capsule enclosing a rotatable pointer to indicate direction and a rotatable magnetic-field detector provided with a permanent magnet. The detector, which is rotatable about an axis colinear with the axis about which the pointer rotates, orients itself with respect to the earth's magnetic field, the detector being tiltable to a degree depending on the inclination of the magnetic field and on the attitude of the compass with respect to the horizontal plane.

The detector is mechanically linked to the pointer so that rotation of the detector results in a corresponding rotation of the pointer regardless of the degree of tilt, whereby the pointer accurately indicates direction. The linkage consists of a pin projecting from the detector and passing through a slot in a fork extending from the pointer, whereby when the detector tilts, the pin then shifts within the slot, but remains coupled to the fork to maintain the linkage without imparting movement to the pointer.

BRIEF DESCRIPTION OF DRAWINGS

For a better understanding of the invention as well as other objects and further features thereof, reference is made to the following detailed description to be read in conjunction with the accompanying drawings, wherein:

FIG. 1 schematically illustrates a tilt-compensating compass in accordance with the invention;

FIG. 2 separately illustrates the linkage between the direction pointer and the magnetic field detector included in the compass;

FIG. 3 illustrates a compass in accordance with the invention provided with a rotatable dial; and FIG. 4 shows a preferred form of magnetic field detector.

DESCRIPTION OF INVENTION

Referring now to FIG. 1, a tilt-compensating magnetic compass in accordance with the invention includes a capsule or cylindrical casing 10 having a circular base plate 11 and a circular cover plate 12. The plates are both formed of transparent material, such as glass, acrylic resin or polycarbonate, so that the user of the compass may view the direction pointer housed within the casing. In practice, the entire capsule may be fabricated of transparent, synthetic-plastic material of high strength.

Attached to the undersurface of cover plate 12 at its center is a bearing 13 in which is journaled the shaft 14 of a non-magnetic direction pointer 15 which is rotatable to an angular position indicating direction. In practice, the pointer need not be a rotatable needle but may take the form of a rotatable disc having indicia thereon.

Anchored on base plate 11 is an upright staff 16 provided at its upper end with a bearing point. This point is received in a conical bearing 18 machined in the undersurface of a permanent magnet bar 19 that functions as a magnetic field detector.

Bar magnet 19 is freely rotatable about the axis of staff 16, so that it orients itself with respect to the earth's magnetic field. Bar magnet 19 is also tiltable with respect to staff 16 to a degree limited by the conical angle of conical bearing 18, so that the bar magnet will never touch the base plate of the capsule. In a preferred embodiment, this angle is such as to permit tilt of bar magnet 19 from a level position (the horizontal plane), as indicated in FIG. 1 by solid lines, to a maximum tilt of about 20 degrees, as represented in dashed lines by bar magnet 19A. The axis of rotation of bar magnet 19, as indicated by axis X, is colinear with the axis of rotation of pointer 15.

The magnetic field detector of the compass, which in FIG. 1 takes the form of a single, permanent magnet bar, may in practice be constituted by one or more bar magnets housed within a non-magnetic case provided with a conical bearing at its center of gravity to receive the bearing point of staff 16.

Essential to the invention is a linkage between the rotatable magnetic field detector 19 and the direction pointer 15 so arranged that when magnetic field detector 19 rotates about its axis, it produces a corresponding rotation of pointer 15 which rotates about a colinear axis, regardless of the degree of detector tilt. In this way, pointer 15 will accurately indicate direction in different latitudes of the earth and also when the attitude of the compass deviates from the horizontal plane.

The linkage between pointer 15 and magnetic field detector 19 includes a fork 20 attached to the underside of the front section of pointer 15 and extending downwardly therefrom. Fork 20, as best seen in FIG. 2, is constituted by a thin, flat, non-magnetic plate having a pair of parallel tines, the space therebetween defining a long slot 21. Affixed to the front end of bar magnet 19 is a pin 22 which projects forwardly from the magnet and passes through slot 21 in fork 20. Essential to proper operation of the linkage is that the axis of the portion of the pin which engages the fork lead through the bearing point.

The length of slot 21 is such that when bar magnet 19 is at its level position at right angles to axis X, pin 22 is then about midway within the slot. When bar magnet 19 is downwardly tilted to its maximum degree, as indicated in dashed lines in FIG. 1 by magnet 19A, then the pin, as indicated in dashed lines by pin 22A, is adjacent the lower, open end of the slot. But the pin is still within the slot; hence, the pin remains coupled to fork 20.

Should magnet bar 19 become upwardly tilted, pin 22 will then shift upwardly in slot 21, but remain coupled to the fork. Thus the fork and pin linkage between rotatable pointer 15 and rotatable bar magnet 19 causes the pointer to assume exactly the same angular orientation with respect to the earth's magnetic field as the bar magnet, regardless of the degree to which the magnet is tilted. Tilting of the bar magnet causes the pin to shift or rotate in the slot, but produces no torque force which would cause the pointer to rotate. Rotation of the pin occurs when the compass tilts around the North-South axes.

As shown in FIG. 3, a rotatable reference dial 23 may be mounted on cover plate 12 of the compass to make it possible to pre-adjust the compass to a desired direction or to geographic North.

In practice, means may be provided to indicate the degree of dip of the magnet bar as a result of the inclination of the magnetic field or a deviation of the attitude of the compass from the horizontal plane. The tip angle can be measured by electro-optical means provided with photocells, or by external magnetic or capacitive detectors secured to base plate 11 and responsive to the tilting motion of magnet bar 19.

In manufacturing the compass, it is important that the magnetic field detector, which in the embodiment shown is a bar magnet, be fully balanced in the horizontal plane. This can be achieved by shifting the gravity center of the bar magnet or its support, or by adding a weight to the magnet.

In order to dampen oscillation of the rotatable and tiltable bar magnet 19 so that it slowly orients itself with respect to the earth's magnetic field and does not overshoot and swing back and forth, the sealed capsule is filled with a liquid which acts to resist rapid movement of the bar magnet. Because under extreme temperature conditions the liquid may expand and in doing so subject the capsule to internal pressure producing stresses that may cause it to rupture, the capsule is not fully filled with liquid, but the liquid is at a level therein creating an air bubble above pointer 15 which does not disturb the operation of the compass, yet allows for expansion of the liquid therein. Alternatively, the sealed capsule may be evacuated or filled with an inert gas.

Instead of a narrow pointer, the indication of direction may be effected by a rotatable disc having appropriate direction indicia printed or scored thereon. One may also print digital or analog code indicia of this disc that can be sensed by an electro-optical reader to provided a readout of direction.

Since in a practical embodiment the magnetic field detector may have a much smaller diameter than the direction pointer, the capsule enclosing the magnetic field detector and the pointer may have a reduced diameter toward its bottom. And by means of magnetometers or capacitive detectors secured to base plate 11 of the capsule and responsive to the dip angle of bar magnet 19, one can measure and display the inclination of the prevailing magnetic field and the deviation of the attitude of the compass from its level position.

Preferred Embodiment

FIG. 4 illustrates a preferred embodiment of a magnetic field detector for a tilt-compensating magnetic compass in accordance with the invention. The detector includes a ring-shaped permanent magnet 24 of high coercive force, supported on a cylindrical hub 25 of a non-magnetic material such as brass, the ring being concentric with the hub.

Machined in the lower end of hub 25 is a conical bearing 26, which may include at its apex a jewel bearing to receive the pointed bearing tip of a staff 27. This staff is anchored on base plate 28 of the capsule enclosing the magnetic field detector and a rotatable pointer (not shown) having a fork 29 attached thereto which extends downwardly from the pointer as in FIG. 1. The detector is tiltable with respect to the staff on which it rotates to a degree limited by the conic angle of conical bearing 26.

Attached to the upper end of hub 25 and projecting laterally therefrom is a coupling pin 30. This pin extends through slot 31 in fork 29 and terminates in a sleeve 32 whose diameter is greater than the width of the slot, so that the coupling pin cannot be withdrawn from the fork. The main function of sleeve 32 is to effect balancing of the magnetic field detector. By means of this sleeve, one can select the latitude at which the magnetic field detector is to be leveled. This leveling could be achieved by shifting the gravity center of the magnetic field detector with respect to the bearing point by means of an oblong hole.

Thus, when the magnetic field detector rotates to orient itself with respect to the earth's magnetic field, the linkage provided by coupling pin 30 and fork 29 cause a corresponding rotation of the pointer. Hence, the pointer accurately indicates direction regardless of the degree to which the detector is tilted; for as the detector tilts, pin 30 rides up or down slot 31, but remains coupled to fork 29 and does not produce a torque force causing rotary movement of the pointer.

The advantage of the cylindrical magnetic field detector shown in FIG. 4 is that it is more compact than the detector shown in FIG. 1 and it is also inherently balanced because it rotates about an axis going through the center of the cylinder.

While there has been shown and described a preferred embodiment of a tilt-compensating magnetic detector in accordance with the invention, it will be appreciated that many changes and modifications may be made therein without, however, departing from the essential spirit thereof. Thus instead of a linkage in the form of a pin affixed to the detector and a fork affixed to the pointer, a reverse arrangement may be used in which the fork is affixed to the detector and the pin to the pointer. Also, instead of using a liquid to dampen oscillation of the magnetic field detector, an induction current brake could be used for this purpose.

We claim:

1. A tilt-compensating magnetic compass comprising:
   (a) a capsule having a base plate and a cover plate, at least one of which is transparent;
   (b) a pointer to indicate direction independent of tilt of the capsule mounted for rotation within the capsule and visible through the transparent plate;
   (c) a magnetic field detector provided with a permanent magnet mounted for rotation about an axis colinear with the pointer axis of rotation and tiltable to a degree that depends on the inclination of the earth's magnetic field and on the extent to which the compass is inclined relative to a horizontal plane, said detector rotating to orient itself with said magnetic field; and
   (d) means linking the rotatable detector to the rotatable pointer to cause the rotation of the detector to produce a corresponding rotation of the pointer and thereby provide an accurate indication of direction regardless of the degree to which the detector or the capsule is tilted.

2. A compass as set forth in claim 1, in which the capsule is entirely made of transparent material.

3. A compass a set forth in claim 2, in which the capsule is sealed and contains a damping liquid, preventing oscillation of the rotatable detector.

4. A compass as set forth in claim 3, in which the liquid partially fills the capsule to create a bubble therein, permitting expansion of the liquid when subjected to an elevated temperature without exerting stress on the capsule.

5. A compass as set forth in claim 1, in which the pointer is mounted on a shaft journaled in a bearing secured to an inner surface of the cover plate.

6. A compass as set forth in claim 1, in which the magnetic field detector is supported on a staff anchored on the base plate, said staff having a bearing point which is received in a conical bearing formed in the detector.

7. A compass as set forth in claim 1, in which the means linking the rotatable detector includes a fork having a slot therein attached to the pointer and extending downwardly therefrom, and a pin projecting from the detector extending through the slot to couple the detector to the pointer so that rotation of the detector produces a corresponding rotation of the pointer, and tilting of the detector causes the pin to shift in the slot without, however, producing movement of the pointer.

8. A compass as set forth in claim 7, in which the fork is constituted by a thin plate having a pair of tines separated by said slot.

9. A compass as set forth in claim 7, wherein said magnetic field detector is formed by a cylindrical hub of non-magnetic material supporting a ring-shaped permanent magnet concentric with the hub, said pin being attached to said hub and projecting laterally therefrom.

10. A compass as set forth in claim 9, in which formed in one end of the hub is a conical bearing having a predetermined conic angle, said hub being supported on a staff having a pointed tip that is received in the bearing, whereby the detector is free to rotate about the staff and to tilt to an extent limited by the conic angle of the bearing.

11. A compass as set forth in claim 10, wherein said conic angle permits a maximum tilt of the detector of about 20 degrees.

* * * * *

UNITED STATES PATENT AND TRADEMARK OFFICE
CERTIFICATE OF CORRECTION

PATENT NO. : 5,233,759
DATED : August 10, 1993
INVENTOR(S) : Hans Gloor and Denis Gigon It is certified that error appears in the above-indentified patent and that said Letters Patent is hereby corrected as shown below:

Col. 5, line 33: delete "capsulemounted" and substitute --capsule mounted--.

Signed and Sealed this

Twenty-ninth Day of March, 1994

Attest:

BRUCE LEHMAN

Attesting Officer     Commissioner of Patents and Trademarks